US 8,307,191 B1

(12) United States Patent
Jain (10) Patent No.: US 8,307,191 B1
(45) Date of Patent: Nov. 6, 2012

(54) PAGE FAULT HANDLING IN A VIRTUALIZED COMPUTER SYSTEM

(75) Inventor: Rohit Jain, Mountain View, CA (US)

(73) Assignee: VMware, Inc., Palo Alto, CA (US)

(*) Notice: Subject to any disclaimer, the term of this patent is extended or adjusted under 35 U.S.C. 154(b) by 1124 days.

(21) Appl. No.: 12/118,600

(22) Filed: May 9, 2008

(51) Int. Cl.
*G06F 12/00* (2006.01)
(52) U.S. Cl. ... 711/206; 711/202; 711/203; 711/E12.058
(58) Field of Classification Search .................. None
See application file for complete search history.

(56) References Cited

U.S. PATENT DOCUMENTS
2006/0259734 A1* 11/2006 Sheu et al. .................... 711/203
* cited by examiner

*Primary Examiner* — Yaima Campos
*Assistant Examiner* — Thanh D Vo (57) ABSTRACT

The invention relates to page fault handling in a virtualized computer system in which at least one guest page table maps virtual addresses to guest physical addresses, some of which are backed by machine addresses, and wherein at least one shadow page table and at least one translation look-aside buffer map the virtual addresses to the corresponding machine addresses. Indicators are maintained in entries of at least one shadow page table, wherein each indicator denotes a state of its associated entry from a group of states consisting of: a first state and a second state. An enhanced virtualization layer processes hardware page faults. States of shadow page table entries corresponding to hardware page faults are determined. Responsive to a shadow page table entry corresponding to a hardware page fault being in the first state, that page fault is delivered to a guest operating system for processing without activating a virtualization software component. On the other hand, responsive to a shadow page table entry corresponding to a hardware page fault being in the second state, that page fault is delivered to a virtualization software component for processing.

22 Claims, 9 Drawing Sheets

PAGE FAULT HANDLING IN A VIRTUALIZED COMPUTER SYSTEM

TECHNICAL FIELD

One or more embodiments of this invention pertain generally to virtual computing, and more specifically to page fault handling in a virtualized computer system.

BACKGROUND

Virtualization technologies are becoming prevalent in the market place. At least some of these technologies provide a virtual hardware abstraction to guest operating systems, and allow them to run in virtual machines in a functionally isolated environment on a host computer without being modified. Virtualization allows one or more virtual (guest) machines to run on a single physical (host) computer, providing functional and performance isolation for processor, memory, storage, etc.

Figure 1:
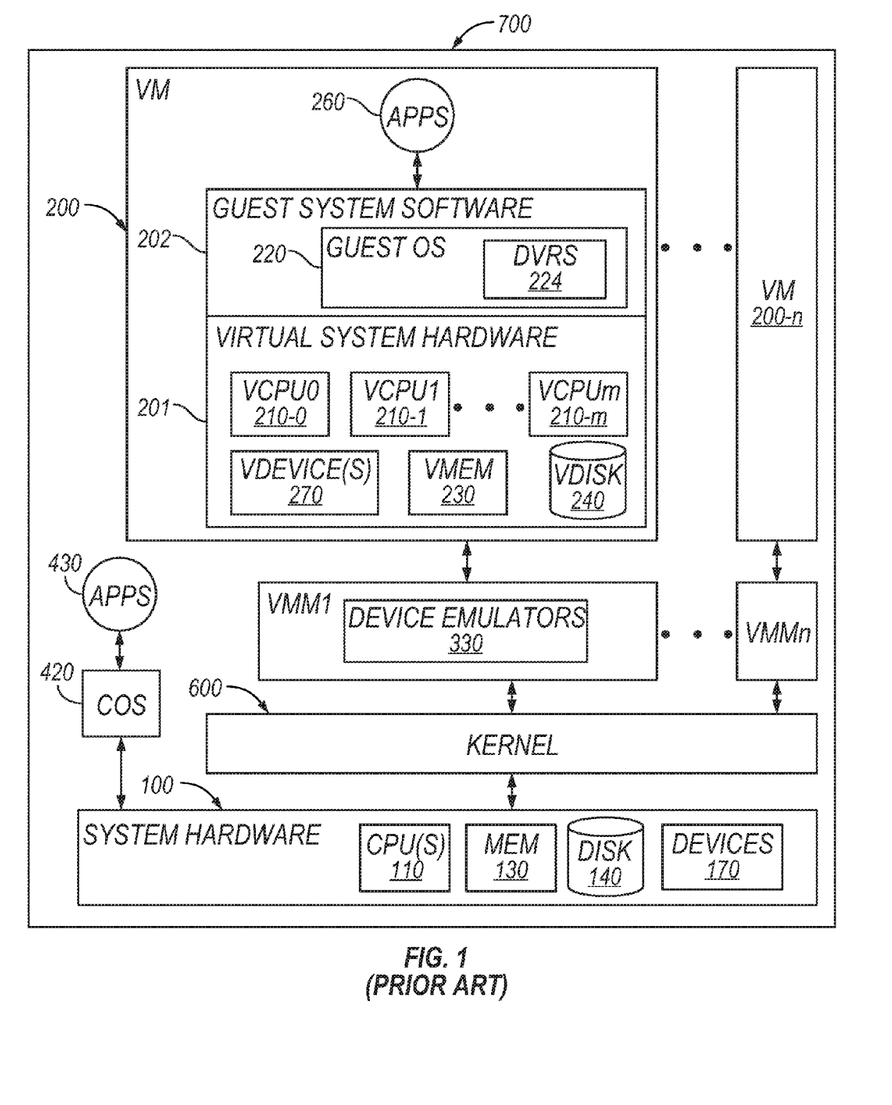
FIG. 1 is a block diagram illustrating one architecture for a virtualized computer system.

As is well known in the field of computer science, a virtual machine is an abstraction—a "virtualization"—of a physical computer system. FIG. 1 shows one possible arrangement of a computer system (computer system 700) that implements virtualization. As shown in FIG. 1, virtual machine or "guest" 200 is installed on a "host platform," or simply "host," which includes system hardware, that is, hardware platform 100, and one or more layers or co-resident components comprising system-level software, such as an operating system or similar kernel, or a virtual machine monitor or hypervisor (see below), or some combination of these. The system hardware typically includes one or more processors 110, memory 130, some form of mass storage 140, and various other devices 170.

Each virtual machine 200 will typically have both virtual system hardware 201 and guest system software 202. The virtual system hardware typically includes at least one virtual CPU, virtual memory 230, at least one virtual disk 240, and one or more virtual devices 270. Note that a disk—virtual or physical—is also a "device," but is usually considered separately because of the important role of the disk. All of the virtual hardware components of the virtual machine may be implemented in software using known techniques to emulate the corresponding physical components. The guest system software includes guest operating system (OS) 220 and drivers 224 as needed for the various virtual devices 270.

Note that a single virtual machine may be configured with more than one virtualized processor. To permit computer systems to scale to larger numbers of concurrent threads, systems with multiple CPUs have been developed. These symmetric multi-processor (SMP) systems are available as extensions of the PC platform, or as other hardware architectures. Essentially, an SMP system is a hardware platform that connects multiple processors to a shared main memory and shared I/O devices. Virtual machines may also be configured as SMP virtual machines. FIG. 1, for example, illustrates multiple virtual processors 210-0, 210-1, . . . , 210-m (VCPU0, VCPU1, . . . , VCPUm) within virtual machine 200.

Yet another configuration is found in a so-called "multi-core" architecture, in which more than one physical CPU is fabricated on a single chip, with its own set of functional units (such as a floating-point unit and an arithmetic/logic unit ALU), and can execute threads independently; multi-core processors typically share only very limited resources, such as some cache. Still another configuration that provides for simultaneous execution of multiple threads is referred to as "simultaneous multi-threading," in which more than one logical CPU (hardware thread) operates simultaneously on a single chip, but in which the logical CPUs flexibly share some resources such as caches, buffers, functional units, etc. One or more embodiments of this invention may be used regardless of the type—physical and/or logical—or number of processors included in a virtual machine.

In many cases applications 260 running on virtual machine 200 will function as they would if run on a "real" computer, even though the applications are running at least partially indirectly, that is via guest O/S 220 and virtual processor(s). Executable files will be accessed by the guest O/S from virtual disk 240 or virtual memory 230, which will be portions of the actual physical disk 140 or memory 130 allocated to that virtual machine. Once an application is installed within the virtual machine, the guest O/S retrieves files from the virtual disk just as if the files had been pre-stored as the result of a conventional installation of the application. The design and operation of virtual machines are well known in the field of computer science.

Some interface is generally required between the guest software within a virtual machine and the various hardware components and devices in the underlying hardware platform. This interface—which may be referred to generally as "virtualization software"—may include one or more software components and/or layers, possibly including one or more of the software components known in the field of virtual machine technology as "virtual machine monitors" (VMMs), "hypervisors," or virtualization "kernels." Unless otherwise indicated, one or more embodiments of the invention described herein may be used in virtualized computer systems having any type or configuration of virtualization software.

FIG. 1 shows virtual machine monitors that appear as separate entities from other components of the virtualization software. Furthermore, some software components used to implement one or more embodiments of the invention are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. The illustrated embodiments are given only for the sake of simplicity and clarity and by way of illustration. Again, unless otherwise indicated or apparent from the description, it is to be assumed that one or more embodiments of the invention can be implemented anywhere within the overall structure of the virtualization software, and even in systems that provide specific hardware support for virtualization.

The various virtualized hardware components in the virtual machine, such as virtual CPU(s) 210-0, 210-1, . . . , 210-m, virtual memory 230, virtual disk 240, and virtual device(s) 270, are shown as being part of virtual machine 200 for the sake of conceptual simplicity. In actuality, these "components" are usually implemented as software emulations 330 included in the VMM.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest O/S could be an off-the-shelf, commercially available OS with no components included specifically to support use in a virtualized environment.

In contrast, another term, which has yet to achieve a universally accepted definition, is that of "para-virtualization." As the term implies, a "para-virtualized" system is not "fully" virtualized, but rather the guest is configured in some way to provide certain features that facilitate virtualization. Unless otherwise indicated or apparent, embodiments of this invention are not restricted to use in systems with any particular "degree" of virtualization and are not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration (which is shown in FIG. 1). In a hosted virtualized computer system, an existing, general-purpose operating system forms a "host" OS that is used to perform certain input/output (I/O) operations, alongside and sometimes at the request of the VMM.

As illustrated in FIG. 1, in many cases, it may be beneficial to deploy VMMs on top of a software layer—kernel 600—constructed specifically to provide support for the virtual machines. This configuration is frequently referred to as being "non-hosted."

Note that kernel 600 is not the same as the kernel that will be within guest O/S 220—as is well known, every operating system has its own kernel. Note also that kernel 600 is part of the "host" platform of the virtual machine/VMM as defined above even though the configuration shown in FIG. 1 is commonly termed "non-hosted;" moreover, the kernel may be both part of the host and part of the virtualization software or "hypervisor." The difference in terminology is one of perspective and definitions that are still evolving in the art of virtualization.

Figure 2:
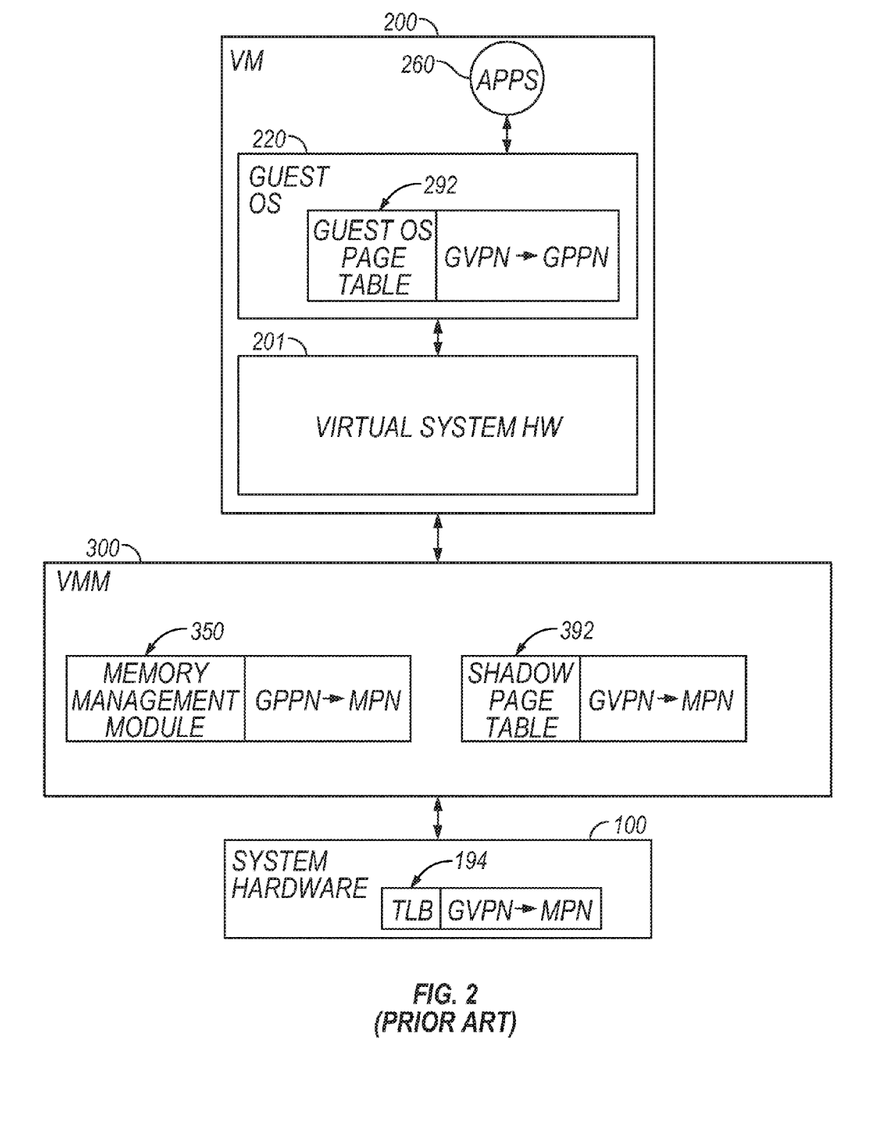
FIG. 2 is a block diagram illustrating memory management and address mapping functions performed by a virtual machine monitor and other various components of a virtualized computer system.

FIG. 2 illustrates virtual memory management and address mapping functions performed by a VMM 300 and various other components of the virtualized computer system. As illustrated in FIG. 2, the guest O/S 220 generates a guest O/S page table 292. The guest O/S page table 292 contains mappings from GVPNs (Guest Virtual Page Numbers) to GPPNs (Guest Physical Page Numbers). Suppose that a guest application 260 attempts to access a memory location having a first GVPN, and that the guest O/S 220 has specified in the guest O/S page table 292 that the first GVPN is backed by what it believes to be a physical memory page having a first GPPN. The mapping from the first GVPN to the first GPPN is used by the virtual system hardware 201. The memory management module 350 translates the first GPPN into a corresponding MPN (Machine Page Number), say a first MPN, using a so-called BusMem/PhysMem table including mappings from guest physical addresses to bus addresses and then to machine addresses. The memory management module 350 creates a shadow page table 392, and inserts a translation into the shadow page table 392 mapping the first GVPN to the first MPN. In other words, the memory management module 350 creates shadow page tables 392 containing the mapping from the GVPN to the MPN. This mapping from the first GVPN to the first MPN is used by the system hardware 100 to access the actual hardware memory that is backing up the GVPN, and the mapping is also loaded into the TLB (Translation Look-Aside Buffer) 194 to cache the GVPN to MPN mapping for future memory access.

Note that the terms "guest virtual page number (GVPN)" and "guest virtual page" are used synonymously herein with the terms "virtual page number" and "virtual page," respectively, and with the terms "linear page number" and "linear page," respectively. Also note that the term "guest physical page number" and "guest physical page" are used synonymously herein with the terms "virtual physical page number" and "virtual physical page," respectively, because they are not real physical page numbers but what the virtual machine 200 believes to be the physical page numbers. Finally, note that the base address of a page is computed by multiplying the page number of the page by the size of the page.

Figure 3:
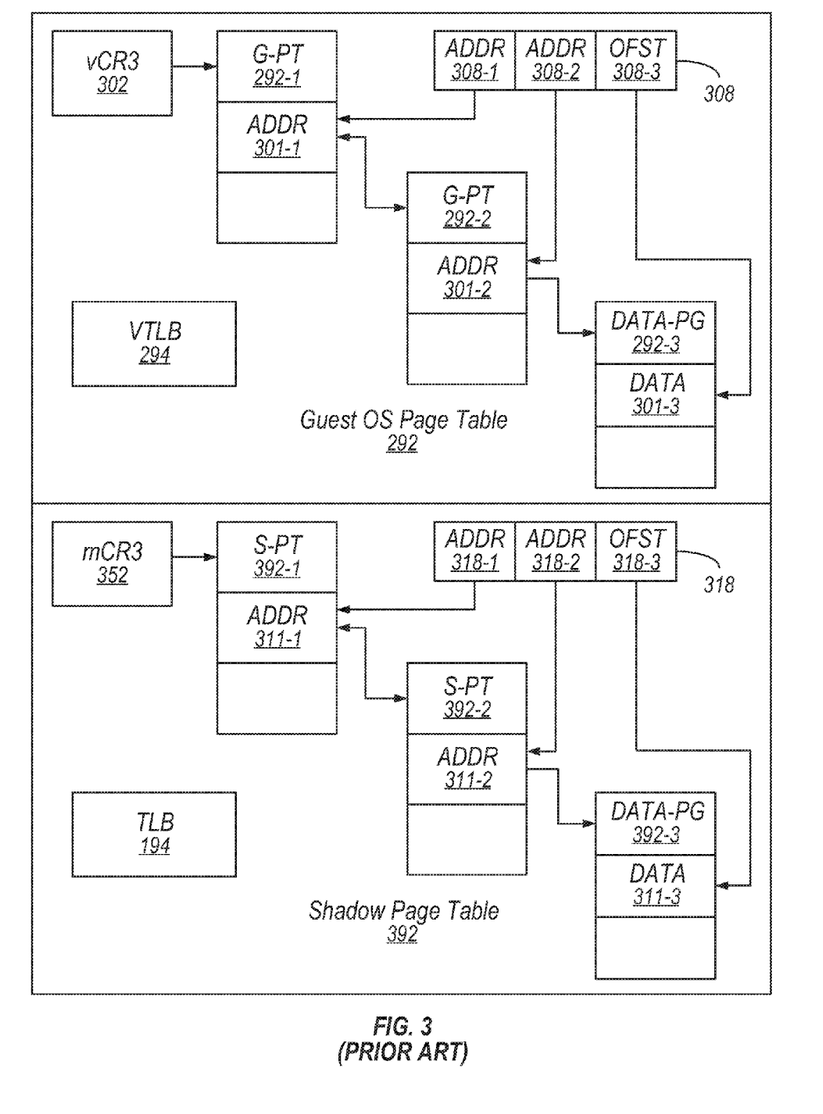
FIG. 3 is a block diagram illustrating a guest O/S page table and a shadow page table.

FIG. 3 illustrates the structure of the guest O/S page table 292 and the shadow page table 392 in a virtualized computer system in more detail. The guest O/S page tables 292 include a plurality of tables (G-PT) 292-1, 292-2 each of which includes entries 301-1, 301-2 with page numbers of other guest page tables or a data page. A data page (DATA-PG) 292-3 includes data 301-3 indicating a guest physical address corresponding to a guest virtual address. vCR3 302 is a virtual page directory base pointer that points to the root guest page table 292-1.

In order to find the guest physical address corresponding to a guest virtual address 308 including a plurality of address fields (ADDR) 308-1, 308-2 and an offset (OFST) field 308-3, a page walk on the guest O/S page table 292 is performed by walking through the guest page tables 292-1, 292-2. Specifically, the root guest page table 292-1 is accessed using the address pointed to by vCR3 302. The first address field 308-1 is an index into entry 301-1 of the root guest page table 292-1. The entry 301-1 includes a physical page number of the next guest page table 292-2, and the next address field 308-2 is an index into entry 301-2 of the guest page table 292-2. The entry 301-2 includes a physical page number of the data page 292-3. The physical address pointing to the data 301-3 corresponding to the virtual address 308 is the base address of the data page 292-3 plus the offset field 308-3. In general, a page walk on the guest O/S page tables 292 presents a significant computational burden on the virtualized computer system.

The structure of the shadow page table 392 mimics that of the guest O/S page table 292. The shadow page table 392 also includes a plurality of tables (S-PT) 392-1, 392-2 each of which includes entries 311-1, 311-2 with page numbers of other tables (S-PT) or a data page 392-3. A data page 392-3 includes data 311-3 indicating a machine address corresponding to a guest virtual address. mCR3 352 is a machine page directory base pointer that points to the root table (S-PT) 392-1.

In order to find the machine address corresponding to a guest virtual address 318 including a plurality of address fields (ADDR) 318-1, 318-2 and the offset (OFST) field 318-3, the CPU 110 performs a page walk on the shadow page tables 392 by walking through the shadow page tables 392-1, 392-2. Specifically, the root shadow page table 392-1 is accessed using the address pointed to by mCR3 352. The first address field 318-1 is an index into entry 311-1 of the root shadow page table 392-1. The entry 311-1 includes a machine page number of the next shadow page table 392-2, and the next address field 318-2 is an index into entry 311-2 of the shadow page table 392-2. The entry 311-2 includes a machine page number of the data page 392-3. The machine address pointing to the data 311-3 corresponding to the virtual address 318 is the base address of the data page 392-3 plus the offset field 318-3.

Figure 4:
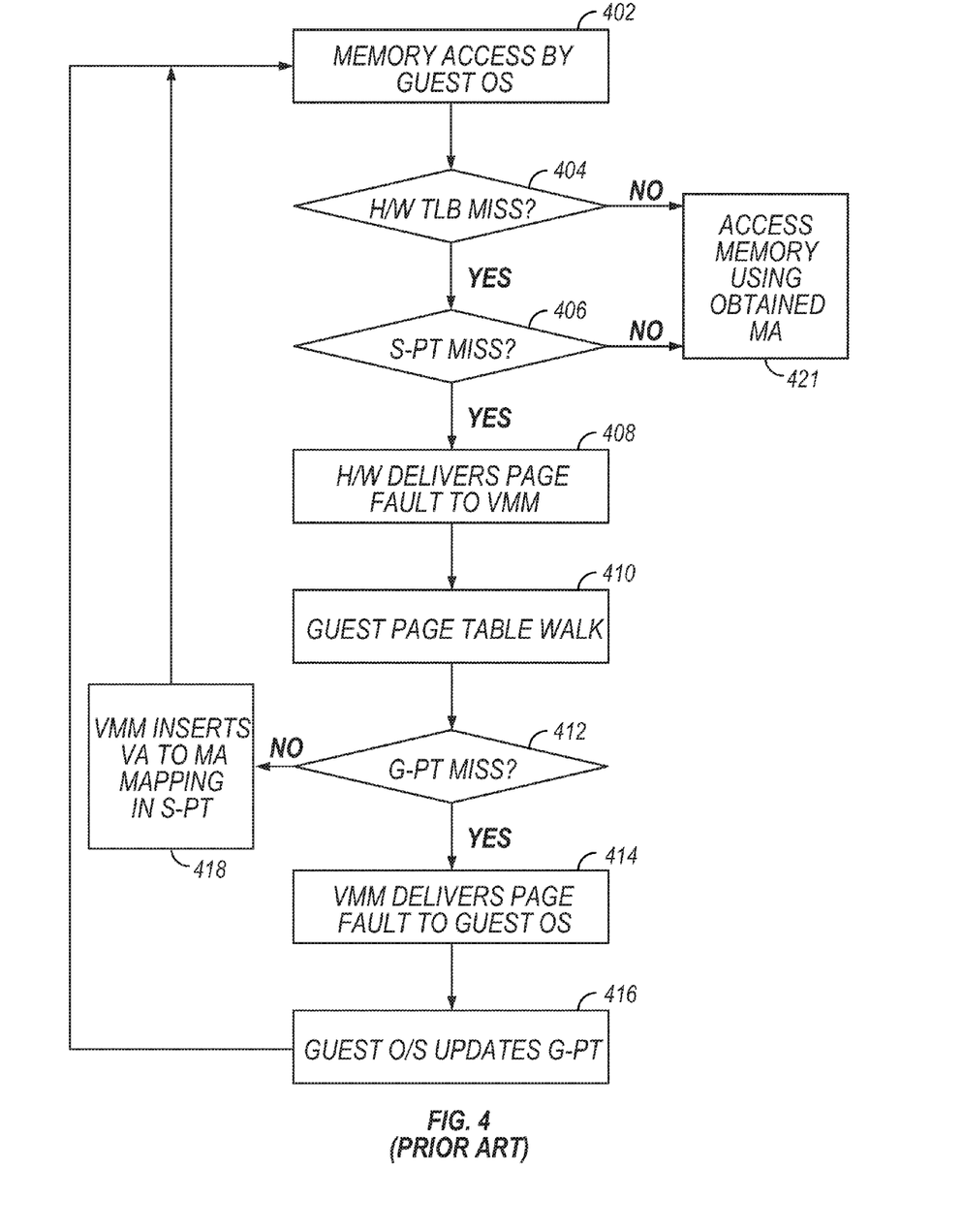
FIG. 4 is a flowchart illustrating steps of an example of a conventional, prior art process for memory access in a virtualized computer system.

FIG. 4 is a flowchart illustrating a conventional process for virtual memory access in a virtualized computer system. Referring to FIG. 4, when the guest O/S 220 (or other software within the virtual machine 200) attempts a memory access 402 using a guest virtual address, the system hardware 100 first searches the translation look-aside buffer 194 for the mapping of the guest virtual address to the corresponding machine address and determines whether there is a hardware TLB miss 404. If the corresponding machine address is found, there is no hardware TLB miss 404, and the memory is accessed 421 using the machine address (MA) obtained from the TLB 194. If the corresponding machine address is not found, there is a hardware TLB miss 404, and the system hardware 100 then searches the shadow page table 392 for the mapping of the guest virtual address to the corresponding machine address and determines whether there is a shadow page table (S-PT) miss 406. If the corresponding machine address is found, there is no shadow page table miss 406, and the memory is accessed 421 using the machine address obtained from the shadow page table 392. If the corresponding machine address is not found, there is a shadow page table miss 406, and the system hardware 100 delivers a hardware page fault 408 to the VMM 300, indicating that the corresponding machine page cannot be found in the hardware TLB 194 or the shadow page table 392.

In the conventional process of virtual memory access in a virtualized computer system, the VMM 300 performs a page walk 410 on the guest O/S page table 292 and determines whether the guest virtual address that caused the hardware page fault 408 has a corresponding mapping to a guest physical address in the guest O/S page table 292. If there is a corresponding guest physical address in the guest O/S page table 292, there is no guest page table (G-PT) miss 412. This type of hardware page fault 408 is referred to herein as a "hidden page fault," because the guest O/S page table 292 does have the mapping to a corresponding guest physical address for the guest virtual address but the corresponding guest virtual address to machine address mapping has not been added to the shadow page table 392 yet. In a hidden page fault, the VMM 300 uses the found guest physical address to determine the corresponding machine address using its Bus-Mem/PhysMem tables and inserts 418 the guest virtual address to machine address mapping in the shadow page table 392. As a result, during the next memory access 402 resulting from a subsequent attempt at executing the instruction accessing the memory, there will still be a hardware TLB miss 404 but there will not be a shadow page table miss 406, and the memory can be accessed 421 using the corresponding machine address. In addition, the guest virtual address to machine address mapping can also be cached in the hardware TLB 194 for future use.

However, if there is no corresponding guest physical address in the guest O/S page table 292, this means there is a guest page table (G-PT) miss 412. This type of hardware page fault 408 is referred to herein as a "true page fault," because even the guest O/S page tables 292 do not contain the mapping to a corresponding guest physical address for the guest virtual address. In a true page fault, the VMM 300 delivers a page fault 414 to the guest O/S 220, and the guest O/S 220 creates an appropriate mapping from the guest virtual address to a guest physical address and updates 416 the guest O/S page table 292 using the created mapping. During the next memory access 402 resulting from a subsequent attempt at executing the instruction accessing the memory, there will still be a hardware TLB miss 404, a shadow page table miss 406, and a hardware page fault 408. However, the corresponding guest physical address will be found during the guest page table walk 410, and thus there will be no guest page table miss 412. The VMM 300 will now be able to insert 418 the guest virtual address to machine address mapping in the shadow page table 392. Therefore, during a subsequent memory access 402 resulting from an attempted re-execution of the instruction accessing the memory, the memory can be accessed 421 using the corresponding machine address found in the shadow page table 392 (see step 406), as explained above.

Note that, in the case of a true page fault, the VMM 300 unnecessarily performs the guest page table walk 410 only to find that the guest virtual address to guest physical address mapping is not present in the guest O/S page table 292 (i.e., guest page table miss 412). Such unnecessary guest page table walks 410 can present a significant computational burden on the virtualized computer system.

U.S. patent application Ser. No. 11/499,125 titled "Bypassing Guest Page Table Walk for Shadow Page Table Entries Not Present in Guest Page Table," ("Table Walk Bypass Application") filed on Aug. 4, 2006 has the same assignee as the present application. The Table Walk Bypass Application discloses a method and system for memory access in a virtualized computer system that eliminates the above-described unnecessary guest page table walks. More specifically, the Table Walk Bypass Application discusses a method and system that do not perform an address translation look-up or a page walk on the guest page tables 292 if the shadow page table entry corresponding to the guest virtual address for accessing the virtual memory indicates that a valid, corresponding mapping from the guest virtual address to a guest physical address is absent in the guest page tables 292. Markers or indicators are stored in the shadow page table entries to indicate that a guest virtual address to guest physical address mapping corresponding to the guest virtual address of the shadow page table entry is not present in the guest page table 292.

As discussed in the Table Walk Bypass Application, when a hardware page fault is issued indicating that the translation look-aside buffers and the shadow page tables 392 do not include a valid machine address mapping corresponding to the virtual address used for accessing the virtual memory 230, it is determined whether an indicator of a shadow page table entry corresponding to the guest virtual address is in a first state or a second state. If the indicator is in the first state, an address translation look-up or a page walk is performed on the guest page tables 292 to determine a guest physical address corresponding to the virtual address. If the indicator is in the second state, a page fault is issued, indicating that the guest page tables 292 do not include the guest physical address corresponding to the virtual address, without performing the address translation look-up or the page walk on the guest page tables 292. The indicator may be a predetermined portion, such as a reserved portion, of the shadow page table entry.

As the Table Walk Bypass Application also discusses, the shadow page tables 392 are managed to maintain the indicator. When a guest page table entry that cannot be used to translate a guest virtual address to a guest physical address is detected, the indicator of the corresponding shadow page table entry for the virtual address is set to a first state. Detecting such guest page table entry may be performed by scanning a subset of entries of the guest page tables 292 to determine whether the entries have valid mappings in the guest page table 292. Detecting the guest page table entry may also be performed by detecting a change from a state where the guest page table entry has a corresponding valid mapping in the guest page tables 292 to another state where the guest page table entry does not have the corresponding valid mapping in the guest page tables 292. By maintaining the indicators of the shadow page table entries in this manner, it is possible to use the indicator to determine whether a guest page walk or address translation look-up can be skipped when a hardware page fault occurs.

In some virtualization environments, an enhanced hardware layer performs some of the interfacing functions between the system hardware 100 and the guest O/S 220. For example, the commercially available Intel® Virtualization Technology (Intel® VT) comprises a set of processor enhancements that enable the VMM 300 to offload certain virtualization tasks to the system hardware 100, including the filtering of error codes resulting from error conditions such as page faults.

SUMMARY OF INVENTION

The invention relates to page fault handling in a virtual machine context in which at least one guest page table maps virtual addresses to guest physical addresses, some of which are backed by machine addresses, and wherein at least one shadow page table and at least one translation look-aside buffer map virtual addresses to corresponding machine addresses. Indicators are maintained in entries of at least one shadow page table, wherein each indicator denotes a state of its associated entry from a group of states consisting of: a first state and a second state. An enhanced virtualization layer processes hardware page faults. States of shadow page table entries corresponding to hardware page faults are determined. Responsive to a shadow page table entry corresponding to a hardware page fault being in the first state, that page fault is delivered to a guest operating system for processing without activating a virtualization software component. On the other hand, responsive to a shadow page table entry corresponding to a hardware page fault being in the second state, that page fault is delivered to a virtualization software component for processing.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 5:
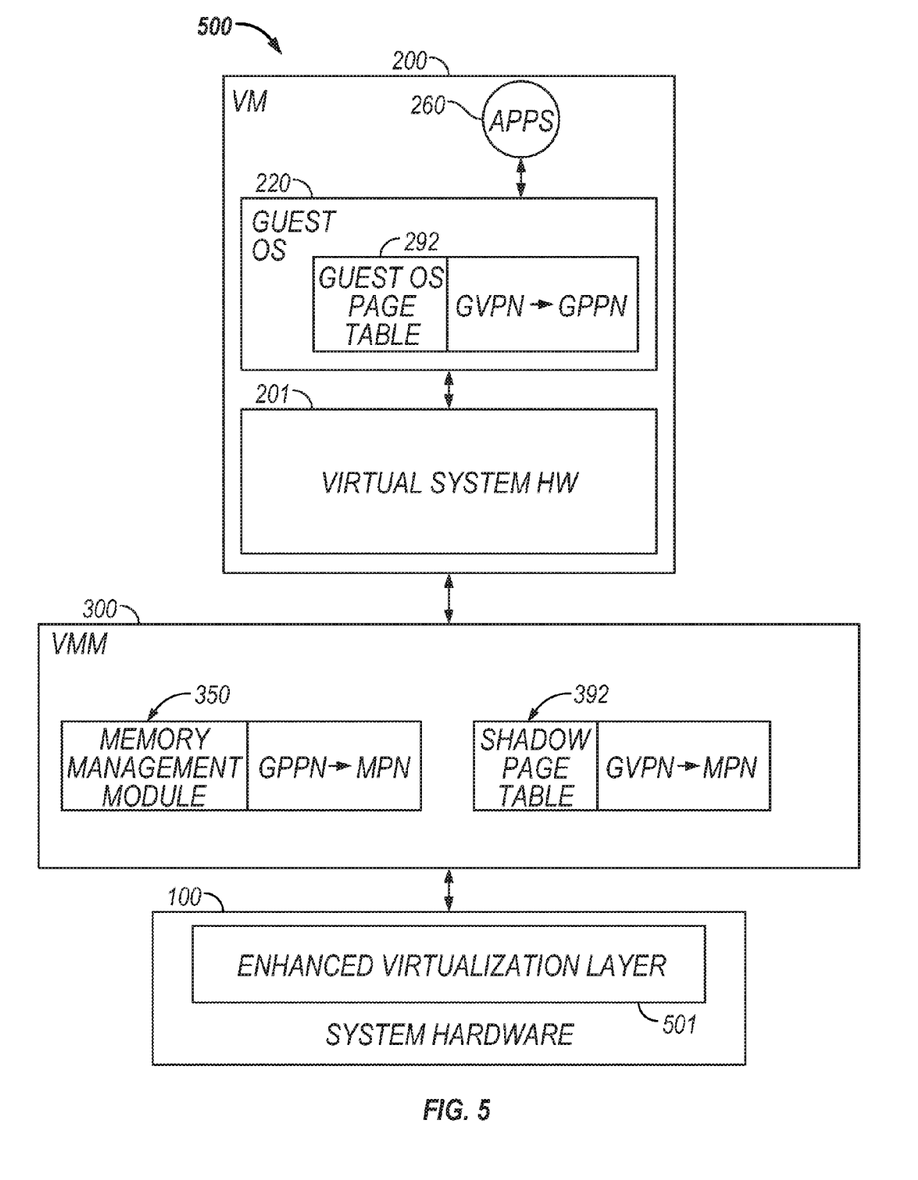
FIG. 5 is a block diagram illustrating a virtualized computer system in which some embodiments of the present invention may be implemented.

FIG. 5 illustrates a virtualized computer system 500, including an enhanced virtualization layer 501 (e.g., Intel® Virtualization Technology), in which the present invention may be implemented. According to some embodiments of this invention, the enhanced virtualization layer 501 performs some of the interfacing functions between the system hardware 100 and the guest O/S 220. In particular, in some embodiments of this invention, the enhanced virtualization layer 501 filters page faults so as to activate the VMM 300 in response to hidden page faults, but generally not in response to true page faults. It is to be understood that although various components are illustrated in FIG. 5 as separate entities, each illustrated component represents a collection of functionalities which can be implemented as software, hardware, firmware or any combination of these. For example, the enhanced virtualization layer 501 is illustrated and described as being implemented in hardware, but such functionality could, of course, be partially or entirely implemented as software. Where a component is implemented as software, it can be implemented as a standalone program, but can also be implemented in other ways, for example as part of a larger program, as a plurality of separate programs or software modules, as a kernel loadable module, as one or more device drivers or as one or more statically or dynamically linked libraries. In particular, although the term "VMM," or "Virtual Machine Monitor," is generally used throughout this detailed description, the present invention is not limited to implementations involving any particular form or configuration of virtualization software.

In the embodiment illustrated in FIG. 5, markers are inserted in shadow page table entries indicating whether or not associated page faults are true (to be handled by the guest O/S 220) or hidden (to be handled by the VMM 300). The methodology for inserting and utilizing such markers is similar to that used in the Table Walk Bypass Application, and its usage within the context of embodiments of the present invention is discussed in detail below in conjunction with FIGS. 6 and 9. The enhanced virtualization layer 501, which supports programmable filtering of error codes, is programmed to exit to the VMM 300 only when the shadow page table entry that caused the page fault has its marker set to indicate that the page fault is a hidden page fault. In this case, the page fault is to be handled by the VMM 300. The enhanced virtualization layer 501 is further programmed so that when the marker in the shadow page table entry indicates that the fault is a true page fault, the enhanced virtualization layer 501 forwards the fault directly to the guest O/S 220 for processing, thereby avoiding activation of the VMM 300. These markers need not always be accurate, but any inaccuracy should preferably be in the form of true page faults being incorrectly identified as hidden page faults. For this type of inaccuracy, the VMM 300 can determine that the page fault is actually a true page fault and forward the page fault to the guest O/S 220, just like in existing virtualization systems. In this case, activation of the VMM 300 can be avoided when true page faults are correctly identified, but no harm is done if true page faults are incorrectly identified as hidden page faults.

Figure 6:
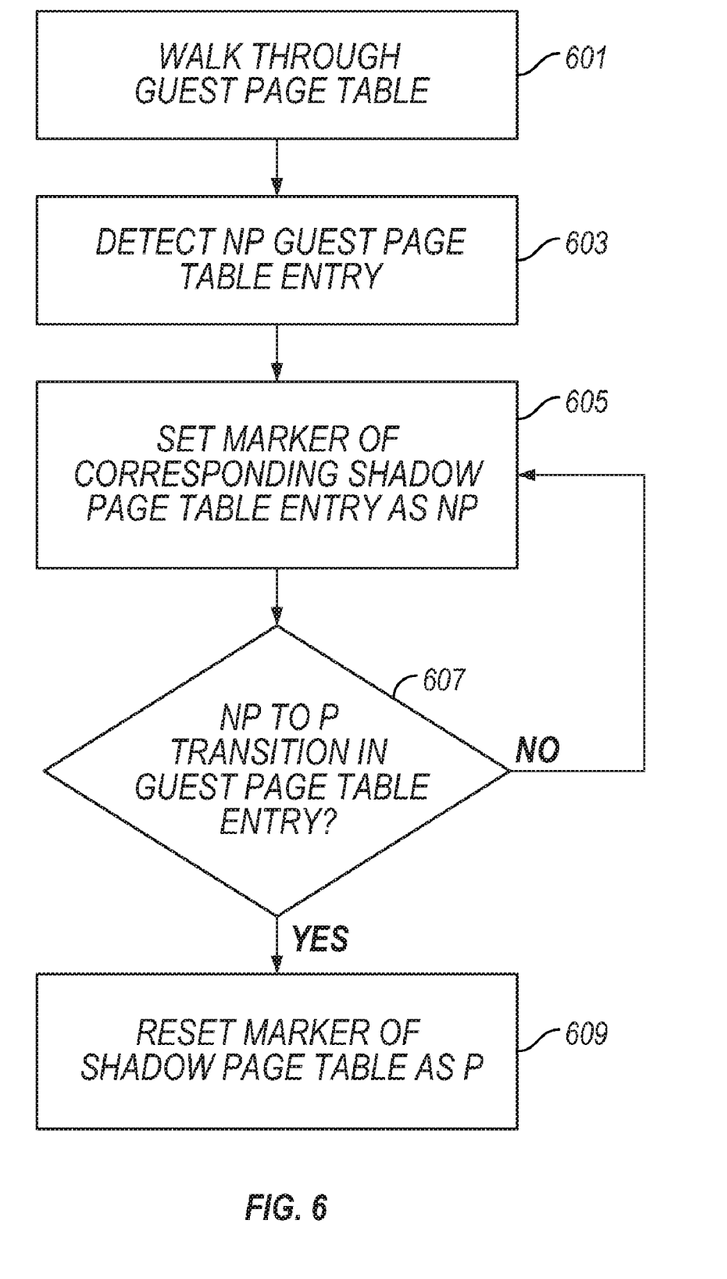
FIG. 6 is a flowchart illustrating steps of a process for setting and maintaining a marker in a shadow page table entry indicating that a corresponding mapping is not present in the guest O/S page table, according to one embodiment of the present invention.

FIG. 6 is a flowchart illustrating a process of setting and maintaining a marker (indicator) in a shadow page table entry indicating that a corresponding mapping is not present in the guest O/S page table 292, according to one embodiment of the present invention. In the process of FIG. 6, the VMM 300 initially sets a marker in each shadow page table entry to indicate, by default, that the guest page table entry corresponding to the shadow page table entry does have a valid mapping in the guest O/S page table 292. As in the Table Walk Bypass Application, the VMM 300 proactively walks 601 through the guest page table 292 (for example, in response to the first memory access or the first trapped page fault), and examines its entries. When the VMM 300 determines 603 that an entry in the guest O/S page table 292 does not have a valid mapping, the VMM 300 updates 605 the marker in the corresponding shadow page table entry to so indicate. More specifically, when the VMM 300 detects 603 a guest page table entry that cannot be used to translate a guest virtual address (page) to guest physical address (data page) (hereinafter referred to as "not present G-PT entry"), the VMM 300 sets 605 a marker in the corresponding shadow page table entry for the guest virtual address to indicate that a page fault on that shadow page table entry is a true page fault.

In some embodiments, the memory management module 350 detects 603 a not present G-PT entry upon the transition of a guest page table entry with a valid guest virtual address to guest physical address mapping in the guest O/S page table 292 ("present G-PT entry") to a not present G-PT entry. Such transition from a present G-PT entry to a not present G-PT entry can be detected by, for example, using a trace applied to the guest O/S page table 292. Traces for the guest O/S page table 292 are typically applied by setting the corresponding guest O/S page table read-only. When a guest page table entry is updated in certain instances to invalidate the guest virtual address to guest physical address mapping in the guest O/S page table 292, the marker in the corresponding shadow page table entry should reflect the update. By virtue of the traces, an update on the read-only entries in the guest O/S page table 292 causes the VMM 300 to detect the update and reflect that change by setting 605 the markers in the corresponding shadow page table entries.

The process illustrated in FIG. 6 also detects 607 the transition of a not present G-PT entry to a present G-PT entry. Such transition can occur, for example, when the guest O/S 220 adds a guest virtual address to guest physical address mapping in the guest O/S page table 292 (see, e.g., step 416 of FIG. 4). If such transition occurs, the marker of the corresponding shadow page table entry is reset 609 to now indicate a present G-PT entry. If no transition occurs, the marker of the corresponding shadow page table entry is maintained 605 so as to indicate a not present G-PT entry.

Figure 7:
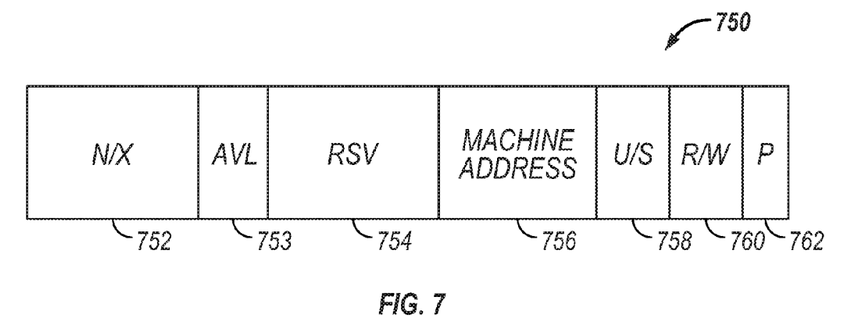
FIG. 7 is a block diagram illustrating an entry in the shadow page table, according to one embodiment of the present invention.

The marker in the shadow page table entry can be set using certain bits of the shadow page table entry. FIG. 7 illustrates an entry in the shadow page table, according to one embodiment of the present invention. As an illustrative example, the shadow page table entry 750 of FIG. 7 is implemented in an Intel x86-type processor. The shadow page table entry 750 comprises N/X (No Execute) bits 752, AVL (available) bits 753, RSV (reserve) bits 754, machine address bits 756, a U/S (user/supervisor) bit 758, a R/W (read/write) bit 760, and a P (present) bit 762.

In one embodiment, the reserved bits 754 and present bits 762 in the shadow page table entries are set to "on" by default, preferably when the shadow page table is first created, to indicate that a corresponding entry may or may not be present in the guest page table 292. In other words, when a shadow page table is first created, all entries may be filled with entries indicating present and reserved, to indicate that the present/not present status of the G-PT entry is unknown. This first, default state, for a given shadow page table entry, may be viewed as a state in which the shadow page table entry is not validated, or a state in which it's unknown whether the corresponding G-PT is present or not. As the shadow page table is filled with valid entries, the reserved bits 754 and the present bits 762 for those entries can be updated to correctly indicate the present/not present status of the G-PT. With an x86 processor, when the reserved bit 754 of a page table entry is set, and an attempted access is made to the corresponding virtual address, a page fault occurs irrespective of the state of the present bit 762. From such a page fault, a determination can be made that the reserved bit 754 was set, as described below.

When a not present G-PT entry is detected, the present bit 762 in the corresponding shadow table entry is set to "off" (i.e., not present), to indicate the status of not present G-PT entry. Although, in one embodiment of the invention, it doesn't matter what the state of the reserved bit 754 is, the reserved bit 754 may nonetheless be set to "off." In fact, for one embodiment, the entire shadow page table entry may be written with a zero. This second state, for a given shadow page table entry, in which the present bit 762 is set to "off," may be viewed as a state in which the shadow page table entry has been validated, but the corresponding G-PT entry is not present. It is to be understood that the not present G-PT entry can be indicated by other bits in the shadow page table entry or any other data structure, so long as it does not interfere with the proper operation of the virtualized computer system.

In one embodiment of the invention, a third state for a shadow page table entry is one in which the shadow page table entry has been validated, and the corresponding G-PT entry is present. In one embodiment, whenever the VMM 300 determines that a G-PT entry is present, the VMM 300 writes an appropriate virtual address mapping into the corresponding shadow page table entry. In this embodiment, the reserved bit 754 of the shadow page table entry is set to "off," and the present bit 762 of the shadow page table entry is set to "on."

In other embodiments, the VMM 300 may not always immediately write a virtual address mapping into the corresponding shadow page table entry upon determining that a G-PT entry is present. In such an embodiment, when a mapping is not immediately written to a shadow page table entry, some similar mechanism may be used to indicate that the G-PT entry is present, but that the corresponding shadow page table entry is not present. Then, once a virtual address mapping is written into the corresponding shadow page table entry, the state of the shadow page table entry may be changed to indicate that both the G-PT entry and the shadow page table entry are present.

Figure 8:
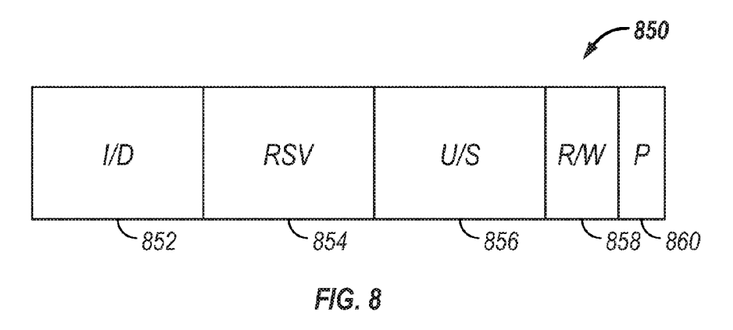
FIG. 8 is a block diagram illustrating a hardware page fault error code, according to one embodiment of the present invention.

FIG. 8 illustrates a hardware page fault error code 850, according to one embodiment of the present invention, based on an x86 processor. The hardware page fault error code 850 is the error code delivered to the enhanced virtualization layer 501 when a hardware page fault occurs. The hardware page fault error code 850 is similar to the shadow page table entry 750, and comprises an I/D (instruction decode) bit 852, RSV (reserve bits) 854, a U/S (user/supervisor) bit 856, a R/W (read/write) bit 858, and a P (present) bit 860. If the bits in the shadow page table entry 750 indicate a not present G-PT entry, the bits of the error code 850 likewise may indicate to the enhanced virtualization layer 501 a not present G-PT entry, together with the hardware page fault.

For embodiments involving the x86 architecture, when a page fault occurs, the present bit 860 of the page fault error code 850 matches the present bit 762 of the corresponding shadow page table entry 750, and the reserved bit 854 of the page fault error code 850 matches the reserved bit 754 of the corresponding shadow page table entry 750. Thus, the enhanced virtualization layer 501 can determine the present/not present status of the G-PT entry by reference to the present bit 860 and the reserved bit 854 of the page fault error code 850.

If the enhanced virtualization layer 501 receives a page fault error code 850 in which the reserved bit 854 is set to "on" and the present bit 860 is set to "on," then the shadow page table entry has not been validated, it is unknown whether the G-PT entry is present or not present, and the page fault is forwarded to the VMM 300. If the enhanced virtualization layer 501 receives a page fault error code 850 in which the present bit 860 is set to "off," then the shadow page table entry has been validated, but the G-PT entry is not present, and the page fault is forwarded directly to the guest O/S 220. If the reserved bit 754 of the shadow page table entry 750 is set to "off" and the present bit 762 of the shadow page table entry 750 is set to "on," then there should be no page fault reported to the enhanced virtualization layer 501.

The following description relates to an embodiment in which address mappings are generally always written to shadow page table entries substantially immediately after a determination is made that the G-PT entry is present. The phrase "substantially immediately," in this context, means that a mapping is written to the shadow page table entry while the VMM 300 (or other virtualization software) remains active, after determining that the G-PT entry is present. In other words, "substantially immediately," in this context, means before any other guest instructions are executed. For example, if virtualization software is proactively looking for present G-PT entries, upon finding such an entry, the virtualization software writes a mapping to the shadow page table entry while it is still active, before returning execution to the guest software. This may typically happen when a shadow page table entry has not yet been validated, so that it has its reserved bit 754 and its present bit 762 set to "on." As another example, suppose that a shadow page table entry has its present bit 762 set to "off," indicating that the G-PT entry is not present. Then suppose that there is an attempted memory access corresponding to that shadow page table entry. The resulting true page fault is forwarded to the guest O/S 220. The guest O/S 220 writes an address mapping to the G-PT entry. A read-only trace on the G-PT is triggered and the virtualization software becomes active. The virtualization software allows or facilitates the attempted write by the guest O/S 220. Then the virtualization software writes an address mapping to the shadow page table entry, sets the reserved bit 754 to "off," and sets the present bit 762 to "on," all before allowing the guest software to execute again.

The description now continues related to the embodiment in which address mappings are written to shadow page table entries substantially immediately after a G-PT entry is determined to be present. If a shadow page table entry 750 is in the first state, in which the reserved bit 754 and the present bit 762 are both set to "on," and the VMM 300 determines that a G-PT is not present, then the shadow page table entry 750 is changed to the second state by setting the present bit 762 to "off." In one such embodiment, the reserved bit 754 is also set to "off," although this is not necessary. If a shadow page table entry 750 is in the first state, and the VMM 300 determines that a G-PT is present, then an address mapping is written to the shadow page table entry, and the shadow page table entry 750 is changed to the third state by setting the reserved bit 754 to "off" and setting the present bit 762 to "on." If a shadow page table entry 750 is in the second state, and the VMM 300 determines that a G-PT is now present, then an address mapping is written to the shadow page table entry, and the shadow page table entry 750 is changed to the third state by setting the reserved bit 754 to "off" and setting the present bit 762 to "on." If a shadow page table entry 750 is in the third state, and the VMM 300 determines that a G-PT is no longer present, then the shadow page table entry 750 is changed to the second state by setting the present bit 762 to "off." If a shadow page table entry 750 is in either the second or third state, and the VMM 300 determines that some change has been made to the G-PT entry, then the shadow page table entry 750 could alternatively be changed to the first state, by setting the reserved bit 754 and the present bit 762 to "on." The shadow page table entry 750 could subsequently be validated again and changed to either the second state or the third state, as described above.

Figure 9:
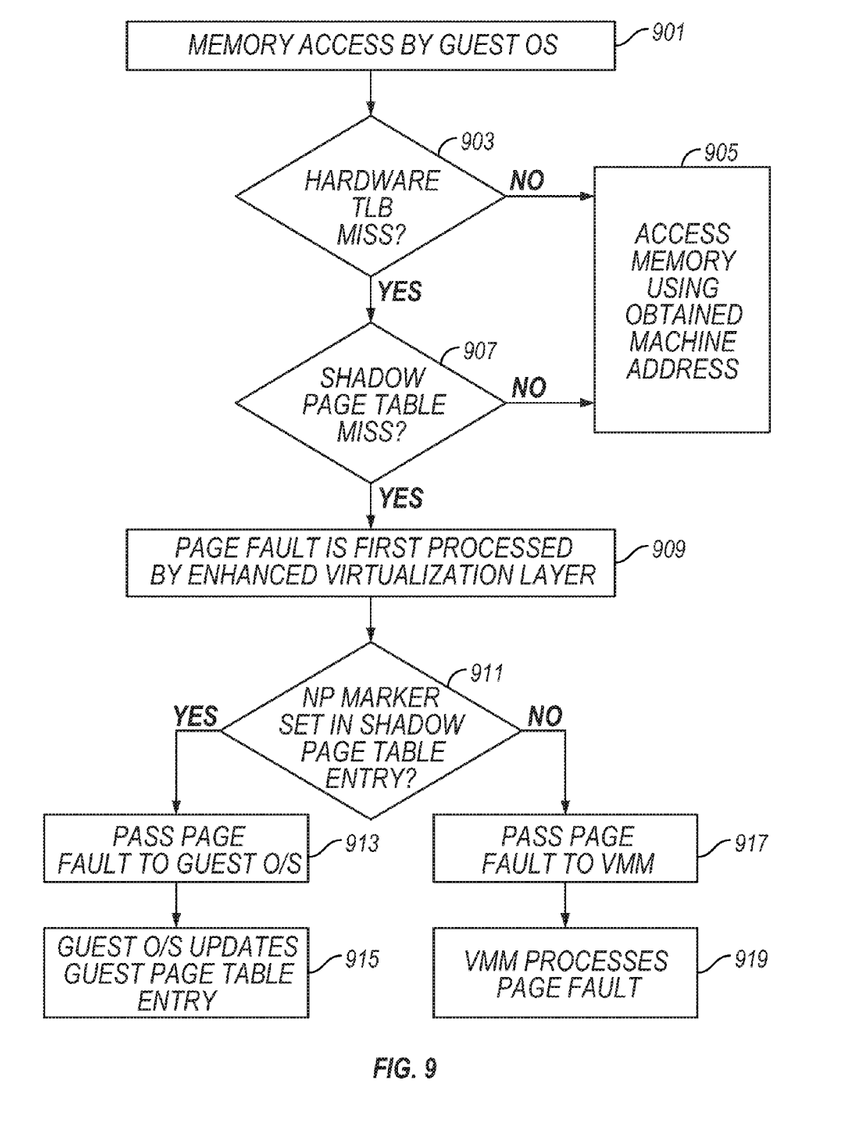
FIG. 9 is a flowchart illustrating steps of a process for memory access in a virtualized computer system, according to one embodiment of the present invention.

FIG. 9 is a flowchart illustrating a process for virtual memory access in a virtualized computer system, according to a more generalized embodiment of the present invention. Referring to FIG. 9, when the guest O/S 220 (or other software within the VM 200) attempts a memory access using a guest virtual address 901, the system hardware 100 first searches the translation look-aside buffer 194 for the mapping of the guest virtual address to the corresponding machine address and determines whether there is a hardware TLB miss 903. If the corresponding machine address is found, there is no hardware TLB miss 903, and the memory is accessed 905 using the machine address (MA) obtained from the TLB 194. If the corresponding machine address is not found, there is a hardware TLB miss 903, and the system hardware 100 further searches the shadow page table 392 for the mapping of the guest virtual address to the corresponding machine address and determines whether there is a shadow page table (S-PT) miss 907. If the corresponding machine address is found, there is no shadow page table miss 907, and the memory is accessed 905 using the machine address obtained from the shadow page table 392.

If the corresponding machine address is not found, there is a shadow page table miss 907 and the page fault is first processed by the enhanced virtualization layer 909. Also, as described above, in embodiments implemented on an x86 platform, where the reserved bit 754 and the present bit 762 are set to "on" to indicate a not present G-PT entry, a page fault will occur for such a S-PT entry, as if it were a S-PT miss 907, even though the present bit 762 is set. In this case also, the page fault is first processed by the enhanced virtualization layer 909. The enhanced virtualization layer 501 examines the page fault error code and determines 911 whether the marker in the shadow page table entry corresponding to the guest virtual address indicates a not present G-PT entry. If the marker is set to so indicate, the hardware page fault is a true page fault where even the guest O/S page table 292 cannot be used to translate the guest virtual address to the guest physical address. In the case of a true page fault, the enhanced virtualization layer 501 passes 913 the page fault directly to the guest O/S 220 without calling the VMM 300. In response to the page fault, the guest O/S 220 creates an appropriate mapping from the guest virtual address to a corresponding guest physical address and updates 915 the guest O/S page table 292 using the created mapping. This will also cause the marker in the corresponding shadow page table entry to be reset, as explained above with reference to steps 607 and 609 of FIG. 6.

On the other hand, if the marker in the shadow page table entry is set to indicate a present G-PT entry, the page fault is (or may be) a hidden page fault, in which case the enhanced virtualization layer 501 passes the page fault 917 to VMM 300 for processing. Because the page fault is at a shadow table level, it cannot be resolved at a guest O/S 220 level. In this case, the VMM 300 processes the hidden page fault 919 conventionally, or according to the Table Walk Bypass Application.

Figure 10:
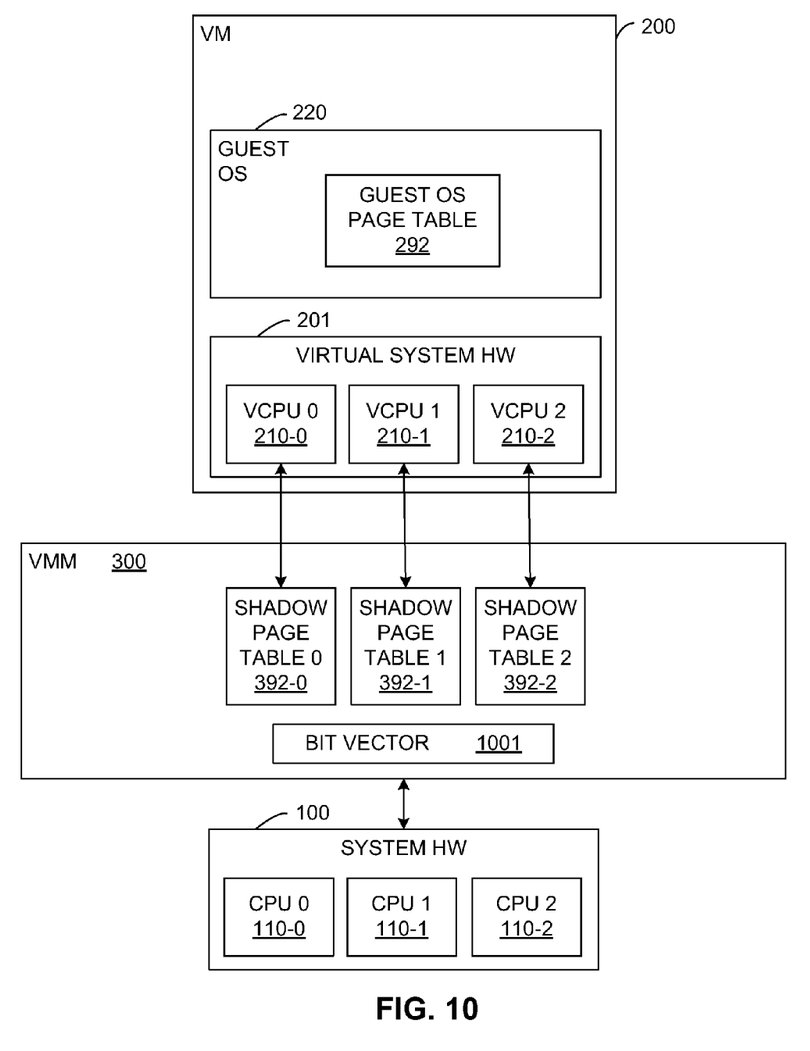
FIG. 10 is a block diagram illustrating an implementation of the invention in a multi-CPU virtual machine environment, according to some embodiments of the present invention.

As illustrated in FIG. 10, virtualized computer systems can have multiple physical processors 110 and/or virtual machines 200 having multiple virtual processors 210. When virtual machines 200 have multiple virtual processors 210, such as virtual processors 210-0, 210-1 and 210-2, the guest O/S 220 typically shares a single guest page table 292 across the multiple virtual CPUs (VCPUs) 210, whereas the VMM 300 typically creates a separate, private shadow page table 392 for each VCPU 210. Although there can be various combinations of CPUs 110 and VCPUs 210 in virtualized computer systems, it can be advantageous to limit the number of VCPUs in a virtual machine to no more than the number of CPUs in the virtualized computer system, so that each set of processes that is to execute on a separate VCPU can actually execute on a separate CPU. Each VCPU is thus "backed" by a separate CPU. Thus, the example of FIG. 10 includes three VCPUs 210-0, 210-1, 210-2 and three CPUs 110-0, 110-1, 110-2. FIG. 10 further shows a single guest page table 292 and three shadow page tables 392-0, 392-1, 392-2, as described above.

VCPUs 210 can effectively be mobile, in that they can be backed by different CPUs 110 at different times. When the execution for a VCPU 210 moves from one CPU 110 to another, an associated shadow page table 392 moves with the VCPU 210. Thus, although shadow page tables 392 are accessed by CPUs 110 and they are managed by VMMs 300 (or other virtualization software) executing on the CPUs 110, it is often simpler to think of VCPUs 210 as managing their corresponding shadow page tables 392. Accordingly, the following description is generally cast in terms of VCPUs 210 managing their corresponding shadow page tables 392, although it will be understood that the shadow page tables 392 are managed by VMMs 300 (or other virtualization software) executing on CPUs 110. As illustrated in FIG. 10, shadow page table 392-0 is associated with VCPU 210-0, shadow page table 392-1 is associated with VCPU 210-1, and shadow page table 392-2 is associated with VCPU 210-2.

Virtualized computer systems having multiple CPUs 110 and/or multiple VCPUs 210 within a virtual machine 200, such as the arrangement illustrated in FIG. 10, can add additional complexity in implementing different embodiments of this invention. In particular, collisions can occur during updates of a shadow page table 392. For example, a problem can occur in such an environment when the guest O/S 220 changes a guest page table entry from a not present state to a present state. Because the guest page table entry status is set to not present at the time of the change (i.e., the guest O/S 220 is changing an entry from its current status of not present to an updated status of present), the corresponding shadow page table entry in each shadow page table would indicate this guest not present status, as per the process described above in conjunction with FIG. 9. Thus, a page fault on such an entry would be treated as a true page fault, to be resolved at a guest O/S 220 level. This is the correct processing while the guest table entry is of status not present. However, when the guest page table entry is changed to present, the VMM 300 should revalidate the corresponding shadow page table entries accordingly. In other words, the VMM 300 should set the marker for the corresponding shadow page table entries to indicate that the G-PT entry is present. When a shadow page table 392 pertaining to one VCPU 210 is updated in this way, the shadow page table 392 for each other VCPU 210 typically needs to be synchronized to reflect this update. This is so because the guest O/S 220 does not expect a not present page fault for that entry on any VCPU 210, once the modification of a guest page table entry to present completes.

Suppose that a given VCPU 210 is to revalidate shadow page tables 392 for each of the VCPUs 210. In this case, the "given" VCPU 210 may be referred to as the "current" VCPU 210 and all other VCPUs may be referred to as "remote" VCPUs 210. Revalidating shadow page table entries in this manner requires careful synchronization, because while a shadow page table 392 associated with a given remote VCPU 210 is being synchronized to reflect an update by a current VCPU 210, that remote VCPU 210 could be modifying the same page table entries at the same time. Note that in the case of x86 hardware, the multiple corresponding TLBs do not need to be addressed under such circumstances, because the revalidation requires changing the shadow page table entry state from not present to present, and x86 hardware TLBs do not cache not present mappings, so there are no not present entries to worry about.

In one embodiment, this synchronization issue is handled by moving all shadow page table entry updates under the protection of a lock, using any type of conventional locking mechanism. However, that can create significant lock contention (and hence performance/scalability issues). Another embodiment provides a methodology in which shadow page table entry update operations remain lock-free. In this embodiment, an atomic compare-and-exchange operation is used to avoid collisions.

In this embodiment, however, when a VMM 300 is creating or deleting remote shadow page tables 392, these operations are performed under the protection of a lock. This lock-protection is employed only for synchronization of remote shadow page table 392 creation and deletion routines, however, which are infrequent operations when compared to standard shadow page table entry updates.

A bit vector 1001 (or other suitable data structure) located in shared memory is used to denote the set of VCPUs 210 currently performing remote shadow page table entry revalidation. In other words, each VCPU 210 is represented by a bit in the bit vector 1001, the state of which indicates whether that VCPU 210 is currently revalidating shadow page table entries. Each VCPU 210 modifies the status of its own bit in the bit vector 1001, as appropriate, when beginning or ending remote shadow page table entry revalidation. Each VCPU 210 also enforces a rule that the present bit in a shadow page table entry can be cleared (or set to "off") only if the bit vector 1001 indicates that no VCPUs 210 are currently performing revalidation. Thus, a shadow page table entry cannot be changed to the second state, where the present bit is set to "off," if any VCPUs 210 are currently performing revalidation.

In this particular embodiment, a shadow page table entry is written with a zero to place the shadow page table entry in the second state, where the present bit of the shadow page table entry is set to "off." Then, when revalidating remote shadow page table entries, for each relevant remote shadow page table 392, the VMM 300 reads the shadow page table entry corresponding to the modified guest page table entry, and if it is zero, the VMM 300 overwrites the contents of the shadow page table entry with the revalidated page table entry. In other words, the VMM 300 writes an address mapping to the shadow page table entry and it sets the reserved bit to "off" and the present bit to "on." A locked compare-and-exchange instruction is used to accomplish the task atomically. This way, even if a remote VCPU 210 races with this operation, the shadow page table entry will ultimately stabilize on the value written by the remote VCPU 210. The remote VCPU 210 cannot be setting the present bit to "off" because the current VCPU 210 is revalidating remote shadow page table entries, and so will have set its bit in the bit vector 1001. The inclusion of the current VCPU 210 in the bit vector 1001 is guaranteed to be observed by remote VCPUs 210 by using a memory fencing operation.

Note that the shadow page table entry always stabilizes on the value written by the remote VCPU 210 if there is a race, which is an acceptable outcome. The possible outcomes of the race are: a) the current VCPU 210 writes the shadow page table entry first, in which case the remote VCPU 210 will overwrite the page table entry completely, and its value will prevail; and b) the remote VCPU 210 updates the upper and/or lower 32 bits of the shadow page table entry before the current VCPU 210 attempts to overwrite it, in which case the compare-and-exchange operation executed by the current VCPU 210 fails. This operation fails because, if the remote VCPU 210 wrote the upper 32 bits, it must have set a reserved bit, because the guest page table entry does not have the present bit set (the guest page table entry is modified only after the revalidation completes). On the other hand, if the remote VCPU 210 wrote the lower 32 bits, it must have set the present bit because of the non-empty VCPU bit vector 1001. In either case, the comparison of the compare-and-exchange operation fails, and the value of the page table entry value remains that written by the remote VCPU 210.

The VMM 300 then modifies the guest page table entry, and removes the current VCPU 210 from the bit vector 1001. Using the above methodology for remote revalidation of shadow page table entries, the unnecessary round trip into the VMM 300 in the case of true page faults can be avoided in a multi-processor virtual machine configuration as well.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are generally not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Accordingly, the disclosure of the present invention is intended to be illustrative, but not limiting, of the scope of the invention, which is set forth in the following claims.

What is claimed is:

1. A computer implemented method for handling page faults in a virtualized computer system in which at least one guest page table maps virtual addresses to guest physical addresses, some of which are backed by machine addresses, and wherein at least one shadow page table and at least one translation look-aside buffer map virtual addresses to corresponding machine addresses, the method comprising the steps of:
   maintaining indicators in entries of at least one shadow page table, wherein each indicator denotes a state of its associated entry from a group of states consisting of:
   a first state indicating that a mapping of a virtual address corresponding to the associated entry to a guest physical address is not present in the guest page table and a second state indicating that said mapping is present in the guest page table;
   processing hardware page faults by an enhanced virtualization layer; determining states of shadow page table entries corresponding to hardware page faults;
   responsive to a shadow page table entry corresponding to a hardware page fault being in the first state, delivering that page fault to a guest operating system for processing without activating a virtualization software component;
   responsive to a shadow page table entry corresponding to a hardware page fault being in the second state, delivering that page fault to the virtualization software component for processing;
   determining from an indicator of a shadow page table entry corresponding to a hardware page fault that a corresponding guest page table entry can be used to translate a guest virtual address to a guest physical address; and
   determining that the page fault is a hidden page fault.

2. A computer implemented method for handling page faults in a virtualized computer system in which at least one guest page table maps virtual addresses to guest physical addresses, some of which are backed by machine addresses, and wherein at least one shadow page table and at least one translation look-aside buffer map virtual addresses to corresponding machine addresses, the method comprising the steps of:
   maintaining indicators in entries of at least one shadow page table, wherein each indicator denotes a state of its associated entry from a group of states consisting of:
   a first state indicating that a mapping of a virtual address corresponding to the associated entry to a guest physical address is not present in the guest page table and a second state indicating that said mapping is present in the guest page table;
   processing hardware page faults by an enhanced virtualization layer; determining states of shadow page table entries corresponding to hardware page faults;
   responsive to a shadow page table entry corresponding to a hardware page fault being in the first state, delivering that page fault to a guest operating system for processing without activating a virtualization software component;

responsive to a shadow page table entry corresponding to a hardware page fault being in the second state, delivering that page fault to the virtualization software component for processing;

detecting at least one guest page table entry that cannot be used to translate a guest virtual address to a guest physical address; and responsive to detecting a guest page table entry that cannot be used to translate a guest virtual address to a guest physical address, setting an indicator of a shadow page table entry corresponding to the virtual address to the first state.

3. The method of claim 1 wherein:

an indicator comprises a predetermined portion of a shadow page table entry.

4. The method of claim 1 further comprising:

determining from an indicator of a shadow page table entry corresponding to a hardware page fault that a corresponding guest page table entry cannot be used to translate a guest virtual address to a guest physical address; and determining that the page fault is a true page fault.

5. The method of claim 2, further comprising:

responsive to detecting a change from a guest page table entry not having a valid mapping to the guest page table entry having a valid mapping, setting the indicator of the shadow page table entry to the second state.

6. The method of claim 1, wherein the virtualized computer system comprises a plurality of virtual central processing units, a single guest page table mapping virtual addresses to guest physical addresses, some of which are backed by machine addresses, and a plurality of shadow page tables and translation look-aside buffers mapping the virtual addresses to the corresponding machine addresses, wherein each virtual central processing unit is associated with a corresponding shadow page table and translation look-aside buffer, the method further comprising:

responsive to updating a state of a shadow page table entry associated with a virtual central processing unit, synchronizing a corresponding update of each of the other shadow page tables.

7. The method of claim 1, wherein:

the enhanced virtualization layer further comprises an enhanced hardware layer configured to perform at least some interfacing functions between system hardware and the guest operating system.

8. The method of claim 1 wherein:

the step of determining a state of a shadow page table entry is performed responsive to a hardware page fault indicating that a translation look-aside buffer and an associated shadow page table do not include a machine address mapping corresponding to a virtual address.

9. The method of claim 2, wherein detecting the at least one guest page table entry that cannot be used to translate a guest virtual address to a guest physical address further comprises:

scanning a subset of entries of the guest page table to determine whether each of the entries has a valid mapping.

10. The method of claim 2, wherein detecting a guest page table entry that cannot be used to translate a guest virtual address to a guest physical address further comprises:

detecting a change from the guest page table entry having a valid mapping to not having the valid mapping.

11. The method of claim 10, wherein detecting the change is performed responsive to an update to the guest page table entry.

12. At least one non-transitory computer readable storage medium containing a computer program product for handling page faults in a virtualized computer system in which at least one guest page table maps virtual addresses to guest physical addresses, some of which are backed by machine addresses, and wherein at least one shadow page table and at least one translation look-aside buffer map virtual addresses to corresponding machine addresses, the computer program product comprising:

program code for maintaining indicators in entries of at least one shadow page table, wherein each indicator denotes a state of its associated entry from a group of states consisting of:

a first state indicating that a mapping of a virtual address corresponding to the associated entry to a guest physical address is not present in the guest page table and a second state indicating that said mapping is present in the guest page table;

program code for processing hardware page faults by an enhanced virtualization layer;

program code for determining states of shadow page table entries corresponding to hardware page faults;

program code for, responsive to a shadow page table entry corresponding to a hardware page fault being in the first state, delivering that page fault to a guest operating system for processing without activating a virtualization software component;

program code for, responsive to a shadow page table entry corresponding to a hardware page fault being in the second state, delivering that page fault to the virtualization software component for processing;

program code for determining from an indicator of a shadow page table entry corresponding to a hardware page fault that a corresponding guest page table entry can be used to translate a guest virtual address to a guest physical address; and program code for determining that the page fault is a hidden page fault.

13. The at least one non-transitory computer readable storage medium of claim 12, wherein the program code for determining a state of a shadow page table entry comprises:

program code for determining a state of a shadow page table entry responsive to a hardware page fault indicating that a translation look-aside buffer and an associated shadow page table do not include a machine address mapping corresponding to a virtual address.

14. The at least one non-transitory computer readable storage medium of claim 12, wherein:

each indicator is maintained in a predetermined portion of a shadow page table entry.

15. The at least one non-transitory computer readable storage medium of claim 12, wherein the computer program product further comprises:

program code for determining from an indicator of a shadow page table entry corresponding to a hardware page fault that a corresponding guest page table entry cannot be used to translate a guest virtual address to a guest physical address; and program code for determining that the page fault is a true page fault.

16. The at least one non-transitory computer readable storage medium of claim 12, wherein the virtualized computer system comprises a plurality of virtual central processing units, a single guest page table mapping virtual addresses to guest physical addresses which are backed by machine addresses, and a plurality of shadow page tables and translation look-aside buffers mapping the virtual addresses to the corresponding machine addresses, wherein each virtual central processing unit is associated with a corresponding shadow page table and translation look-aside buffer, the computer program product further comprising:

program code for, responsive to updating a state of a shadow page table entry by an associated virtual central processing unit, synchronizing a corresponding update of each of the other shadow page tables.

17. The at least one non-transitory computer readable storage medium of claim 12, wherein:

the enhanced virtualization layer further comprises an enhanced hardware layer configured to perform at least some interfacing functions between system hardware and the guest operating system.

18. At least one non-transitory computer readable storage medium containing a computer program product for handling page faults in a virtualized computer system in which at least one guest page table maps virtual addresses to guest physical addresses, some of which are backed by machine addresses, and wherein at least one shadow page table and at least one translation look-aside buffer map virtual addresses to corresponding machine addresses, the computer program product comprising:

program code for maintaining indicators in entries of at least one shadow page table, wherein each indicator denotes a state of its associated entry from a group of states consisting of:

a first state indicating that a mapping of a virtual address corresponding to the associated entry to a guest physical address is not present in the guest page table and a second state indicating that said mapping is present in the guest page table;

program code for processing hardware page faults by an enhanced virtualization layer;

program code for determining states of shadow page table entries corresponding to hardware page faults;

program code for, responsive to a shadow page table entry corresponding to a hardware page fault being in the first state, delivering that page fault to a guest operating system for processing without activating a virtualization software component;

program code for, responsive to a shadow page table entry corresponding to a hardware page fault being in the second state, delivering that page fault to the virtualization software component for processing;

program code for detecting at least one guest page table entry that cannot be used to translate a guest virtual address to a guest physical address; and     program code for, responsive to detecting a guest page table entry that cannot be used to translate a guest virtual address to a guest physical address, setting an indicator of a shadow page table entry corresponding to the virtual address to a first state.

19. The at least one non-transitory computer readable storage medium of claim 18, wherein the program code for detecting the at least one guest page table entry that cannot be used to translate a guest virtual address to a guest physical address further comprises:

program code for scanning a subset of entries of the guest page table to determine whether each of the entries has a valid mapping.

20. The at least one non-transitory computer readable medium of 18, wherein the program code for detecting a guest page table entry that cannot be used to translate a guest virtual address to a guest physical address further comprises:

program code for detecting a change from the guest page table entry having a valid mapping to not having the valid mapping.

21. The at least one non-transitory computer readable storage medium of claim 20, wherein the program code for detecting the change further comprises:

program code for detecting the change responsive to an update to the guest page table entry.

22. The at least one non-transitory computer readable storage medium of claim 18, wherein the computer program product further comprises:

program code for, responsive to detecting a change from a guest page table entry not having a valid mapping to the guest page table entry having a valid mapping, setting the indicator of the shadow page table entry to the second state.

\* \* \* \* \*